(12) United States Patent
Huber et al.

(10) Patent No.: US 9,073,638 B2
(45) Date of Patent: Jul. 7, 2015

(54) LIFT FOR AN AIRCRAFT, AIRCRAFT SEGMENT WITH A CORRESPONDING LIFT AND METHOD FOR STOWING FREIGHT ITEMS IN AN AIRCRAFT

(71) Applicant: Telair International GmbH, Miesbach (DE)

(72) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 129 days.

(21) Appl. No.: 13/693,493

(22) Filed: Dec. 4, 2012

(65) Prior Publication Data

US 2013/0168500 A1    Jul. 4, 2013

(30) Foreign Application Priority Data

Dec. 8, 2011  (DE) .......................... 10 2011 056 188
Dec. 16, 2011  (DE) .......................... 10 2011 056 530
Jan. 10, 2012  (DE) .......................... 10 2012 100 131

(51) Int. Cl.
  *B64D 9/00*        (2006.01)
(52) U.S. Cl.
  CPC ........................ *B64D 9/00* (2013.01)
(58) Field of Classification Search
  USPC ............. 244/118.1, 137.1, 119, 173.1, 173.3; 186/40, 47, 51
  See application file for complete search history.

(56) References Cited

U.S. PATENT DOCUMENTS

| | | | | |
|---|---|---|---|---|
| 1,197,146 | A | | 9/1916 | Olson |
| 5,413,292 | A | * | 5/1995 | Luria .......................... 244/118.1 |
| 5,496,000 | A | * | 3/1996 | Mueller ...................... 244/118.1 |
| 5,967,739 | A | * | 10/1999 | Bennison .................... 414/744.3 |
| 6,412,603 | B1 | * | 7/2002 | Nervig et al. .................. 187/267 |
| 6,454,208 | B1 | * | 9/2002 | Nervig et al. ............... 244/118.1 |
| 8,286,914 | B2 | * | 10/2012 | Breuer et al. ............... 244/118.5 |
| 2005/0230540 | A1 | | 10/2005 | Harrington et al. |
| 2006/0133913 | A1 | * | 6/2006 | Helmner ....................... 414/373 |
| 2007/0284481 | A1 | | 12/2007 | Linero |
| 2010/0230536 | A1 | * | 9/2010 | Breuer et al. ............... 244/118.1 |
| 2013/0186999 | A1 | * | 7/2013 | Huber, Thomas .......... 244/118.1 |

FOREIGN PATENT DOCUMENTS

| | | | | |
|---|---|---|---|---|
| DE | 102006022144 A1 | | 11/2007 | |
| DE | 102007023658 | | 11/2008 | |
| DE | 102009012998 | | 9/2010 | |
| DE | 102010013219 | | 9/2011 | |
| DE | 102011052299 A1 | | 1/2013 | |
| DE | 102012100131 | * | 6/2013 | ............... B64D 9/00 |
| GB | EP 2602187 A1 | * | 6/2013 | ............... B64D 9/00 |
| WO | 2005066022 | | 6/2005 | |
| WO | 2007051593 | | 10/2007 | |

\* cited by examiner

*Primary Examiner* — Benjamin P Lee
(74) *Attorney, Agent, or Firm* — Barnes & Thornburg LLP

(57) ABSTRACT

The present invention concerns a lift for an aircraft. This is used to store freight items and/or transport these between a cargo hold and a passenger cabin. The lift comprises at least one receiver compartment, in particular a lift cabin, to receive a freight item, in particular a suitcase and/or a bag; at least one first opening and at least one second opening for loading and/or unloading the lift, wherein the first opening opens into a passenger cabin and the second opening into a cargo hold; and at least one guide ring in relation to which the receiver compartment is arranged mobile such that the receiver compartment is displaceable along the guide ring in a rotation movement about a rotation axis.

13 Claims, 6 Drawing Sheets

Figure 1:
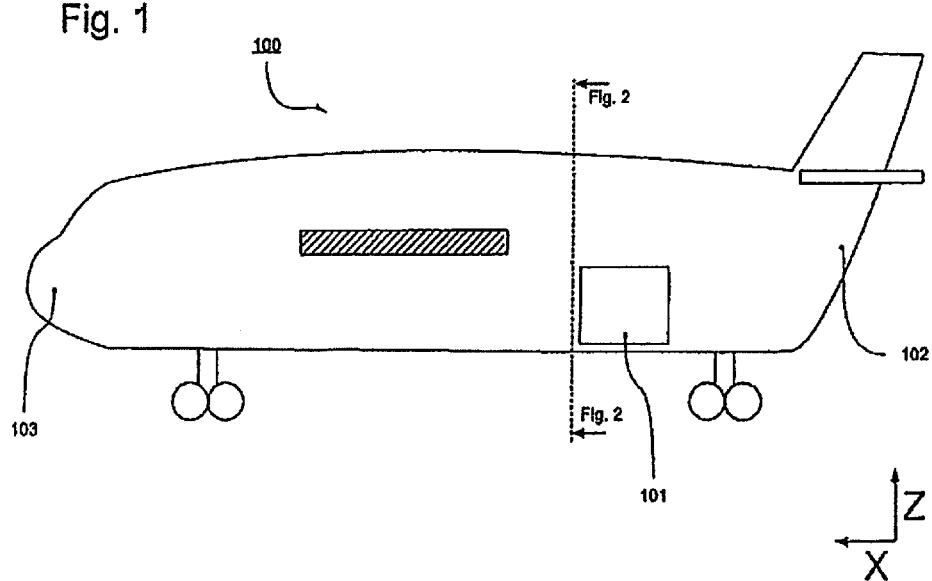

LIFT FOR AN AIRCRAFT, AIRCRAFT SEGMENT WITH A CORRESPONDING LIFT AND METHOD FOR STOWING FREIGHT ITEMS IN AN AIRCRAFT

BACKGROUND AND SUMMARY

The invention concerns a lift for an aircraft, an aircraft segment with a corresponding lift and a method for stowing freight items in an aircraft.

Efficient loading and unloading of aircraft has always been a critical process. The operators of wide-bodied aircraft aim to optimize this process such that the time spent thereon is minimized, in order to save costs. However passengers frequently carry with them numerous and widely varying freight items (e.g. suitcases) and want secure transport of their freight items.

A further problem which occurs on air transport of freight items for passengers is that even handover of freight items is undesirable for many passengers. The passenger would prefer to take all freight items or luggage with him into the passenger cabin in order to have access to these luggage items at any time. Lengthy handover of freight items at check-in can then be omitted. Also this gives the passenger the advantage that on leaving the aircraft, he need not wait for his luggage to be unloaded and finally delivered to him. A trend is therefore appearing in which more and more freight items are being carried in the passenger cabin. Existing passenger cabins however often do not have sufficient capacity to take all these freight items. Even when the freight items can be received in the passenger cabin by the provision of sufficient storage space, substantial problems arise not least for aircraft operators. Firstly the luggage must be examined very precisely to avoid risk of terrorist attacks. Secondly incorrect stowage of luggage items or freight items can lead to injury to passengers. Finally the provision of corresponding storage space leads to very little space remaining in the passenger cabin for the passengers. This often has a negative effect on the well-being of passengers.

To take at least partial account of these problems, WO 2007/051593 proposes providing suitable freight containers directly at the entrance to the aircraft which can be loaded by the passengers. These freight containers are then brought into the cargo hold of the aircraft, transported in the aircraft and after landing re-arranged so that the passengers can collect their own freight items. During flight however there is no access to the freight items.

DE 10 2010 013 219 describes a freight loading system which allows deposit and retrieval of freight items in the cabin. The system is expensive and retrieval of a specific freight item can take considerable time.

DE 10 2009 012 998 A1 discloses an annular freight conveyor device for storage and transport of freight items. This is preferably used for storage and provision of meals. The conveyor device has two loading openings, wherein one of the openings opens into the passenger cabin and another is accessible from the outside.

Starting from this prior art, in particular DE 10 2010 013 219, the object of the present invention is to provide a lift for better equipment of an aircraft so that a more comfortable and efficient transport of freight items can take place. Furthermore the process of loading and unloading the cargo hold is simplified. Overall it enables the passengers to deposit their freight items as quickly and easily as possible, while retaining access to these at any time.

This object is achieved by a lift, an aircraft segment and a method according to the respective claims therefor.

In particular the object is achieved by a lift for an aircraft which comprises:

at least one receiver compartment, in particular a lift cabin, to receive a freight item, in particular a suitcase and/or a bag;

at least one first opening and at least one second opening for loading and/or unloading the lift, wherein the first opening opens into a passenger cabin and the second opening into a cargo hold;

characterized by at least one guide ring in relation to which the receiver compartment is arranged rotationally mobile such that the receiver compartment is displaceable along the guide ring, in particular in a rotation movement about a rotation axis.

According to the application the guide ring and/or conveyor ring can be an open or closed ring. For example the ring can extend over 45, 90, 100, 120, 180 (half open), 220, 270, 300 or 360 (closed) degrees. To this extent it could be called a guide ring segment. According to the application the guide ring need not necessarily be formed circular but can have an elliptical form or any other form with one or more curved segments. Consequently the rotation movement can take place about several rotation axes running parallel to each other. For example the guide ring could also have a substantially rectangular design with rounded corners.

The lift can successfully be used for receiving freight items in the passenger cabin of an aircraft and delivering these again as required. Furthermore the lift can be used to transport the freight items to and fro between separate compartments, for example a passenger cabin and a cargo hold. Because of the annular design of the lift, this can be installed particularly efficiently in an aircraft, in particular close to the outer skin of the aircraft, so that the interior of the aircraft can be utilized optimally. In particular it is conceivable to arrange the lift between the ribs and/or frames which are necessary in conventional aircraft as supporting structures. To this extent previously unused cavities can be used for stowage and transport of freight items. By means of the lift according to the invention it is also possible to utilize unused cavities in the bilge areas of the aircraft.

The lift can comprise at least one guide ring or a first guide ring segment and at least one second guide ring or second guide ring segment, wherein the receiver compartment is arranged between the guide rings, in particular in a sliding block guide. To this extent it is conceivable to use the guide rings or guide ring segments as side limitations for the receiver compartment or to suspend individual lift cabins which form the receiver compartment between the guide rings.

In one embodiment at least one conveyor ring can be provided which is arranged, in particular rotationally mobile, between the guide rings and comprises at least one subdivision segment to form the at least one receiver compartment. The subdivision segment or segments can be arranged on the inside (side facing the rotation axis). Preferably they extend perpendicular to the tangential plane and/or the torque of the rotation movement. Finally it is conceivable to form the conveyor ring as a continuous conveyor which runs circular or elliptical. For example individual segments of this conveyor ring can form the rear wall of a receiver compartment, wherein the individual subdivision segments delimit the receiver compartments at the top and bottom. Furthermore it is conceivable for a freight item on handover to be deposited on one of the subdivision segments. On transport of the freight item, this subdivision segment then is lowered or raised as part of the rotation movement of the conveyor ring.

To this extent the individual receiver compartments can be formed by very few and very robust components. It is conceivable to form the conveyor ring from a flexible material, for example an elastomer.

As already explained, a multiplicity of subdivision segments can be provided which are arranged such that the subdivision segments in each case in pairs delimit a receiver compartment (top and bottom).

Secondly it is conceivable to provide a multiplicity of conveyor cabins or lift cabins which form a chain and which can be swiveled in a rotation movement about the rotation axis. In this embodiment example it is particularly advantageous if the guide rings have a sliding block guide.

The at least one receiver compartment can comprise a deposit device with a deposit surface which is arranged rotationally mobile in the receiver region such that the deposit surface is oriented parallel to a passenger and/or freight deck of the aircraft irrespective of the position of the receiver compartment relative to the guide ring. To this extent it would be possible to store in this ring food, drinks, coffee machines, cookers etc. without the objects being tilted on displacement of the receiver compartments.

The lift can be formed such that at least one receiver compartment can be brought into at least one receiving position opposite one of the openings for loading and/or unloading, and the receiver compartment can be moved in relation to the receiving position by at least 45°, in particular at least 90°, in particular at least 120°, in particular at least 160°, in particular at least 180° along the guide ring. Where the swivel angle on movement of the respective receiver compartment is relatively low, this guarantees that the objects introduced are not tilted excessively. To this extent for example drinks, food or delicate items could be arranged or integrated in the receiver compartments.

The lift can have a freight administration device with at least one input device to detect a code preferably allocated to the freight item, wherein the freight administration device is adapted such that after input of a code, it identifies the freight item and/or receiver compartment allocated to the code and controls at least the lift such that the corresponding receiver compartment is brought into a/the receiving position for unloading the receiver compartment. To this extent it is possible for the lift to be controlled electronically, wherein each passenger independently can deposit his own freight item. The lift serves either to transport the freight item away or to store it until the passenger retrieves the freight item. A corresponding retrieval can take place for example in that the passenger enters a specific code which identifies either himself or the freight item or the receiver compartment used.

The input device can be a read device for an identification device, in particular a passive transponder and/or a 2D and/or 3D code, preferably arranged on or in the freight item. To this extent the lift can independently detect an identification number or identification code allocated to the freight item without the passenger needing to enter this. Retrieval of the freight item is facilitated by the automatic detection of this identification number or identification code.

The freight administration device can be adapted to store, for a freight item placed in the lift, a correlation between a/the code allocated to the freight item and the receiver compartment of the freight item and/or a correlation between a code allocated to a passenger and the receiver compartment. For example it is then possible for the freight administration device to determine the corresponding receiver compartment after input of the code allocated to the freight item and control the lift such that the passenger obtains access to the corresponding receiver compartment.

This object is furthermore achieved by an aircraft segment, in particular a barrel-shaped aircraft segment, which contains a lift as already described. Similar advantages arise as already described in connection with the lift. The lift can be an integral part of the aircraft segment or be installed in this later.

Preferably the lift is dimensioned such that it can fit between the frames of a corresponding aircraft segment. Preferably the guide rings run parallel to these frames. Alternatively the frames can form parts of the guide ring or the entire guide ring. The guide ring can thus serve as a guide for the individual receiver compartments of the lift and serve to stiffen the aircraft construction.

Accordingly the rotation access of the lift can run substantially parallel to the longitudinal direction of the aircraft and/or the aircraft segment.

The aircraft segment can comprise at least one first opening and at least one second opening for loading and/or unloading the lift, wherein the first opening opens into a passenger cabin and the second opening into a cargo hold. To this extent the lift can serve to transport freight items from the passenger cabin to the cargo hold or vice versa. Individual receiver compartments can naturally also be used for longer term storage of freight items.

The aircraft segment can comprise at least one robot with at least one robot arm to remove freight items from the at least one receiver compartment, wherein the robot is preferably arranged in a/the cargo hold. To this extent the lift can deliver freight items from the passenger cabin to the cargo hold so that the robot has access thereto. The robot can according to the invention be used to deposit individual freight items in storage regions or storage containers provided for this.

The aircraft segment can comprise a holder device attached to the ceiling construction and/or wall construction, in particular with at least one linear guide, and a drive unit for moving the robot attached to the holder device, preferably along a longitudinal axis of the aircraft. To this extent the robot can move along the longitudinal direction of the aircraft and thus distribute the freight items over the entire cargo hold. The robot arm can perform further tasks on loading and unloading of freight items.

The robot and/or the cargo hold of the aircraft segment can be adapted as described in German patent application file ref. 102011052299.9.

Said object can furthermore be achieved by a method for stowing freight items from a passenger cabin of an aircraft, wherein the method comprises the following steps:

receiving the freight item in a first receiver compartment of a lift;

swivelling of the receiver compartment about a rotation axis so that a further receiver compartment is ready to receive further freight items in the passenger cabin.

BRIEF DESCRIPTION OF THE DRAWING FIGURES

Figure 2:
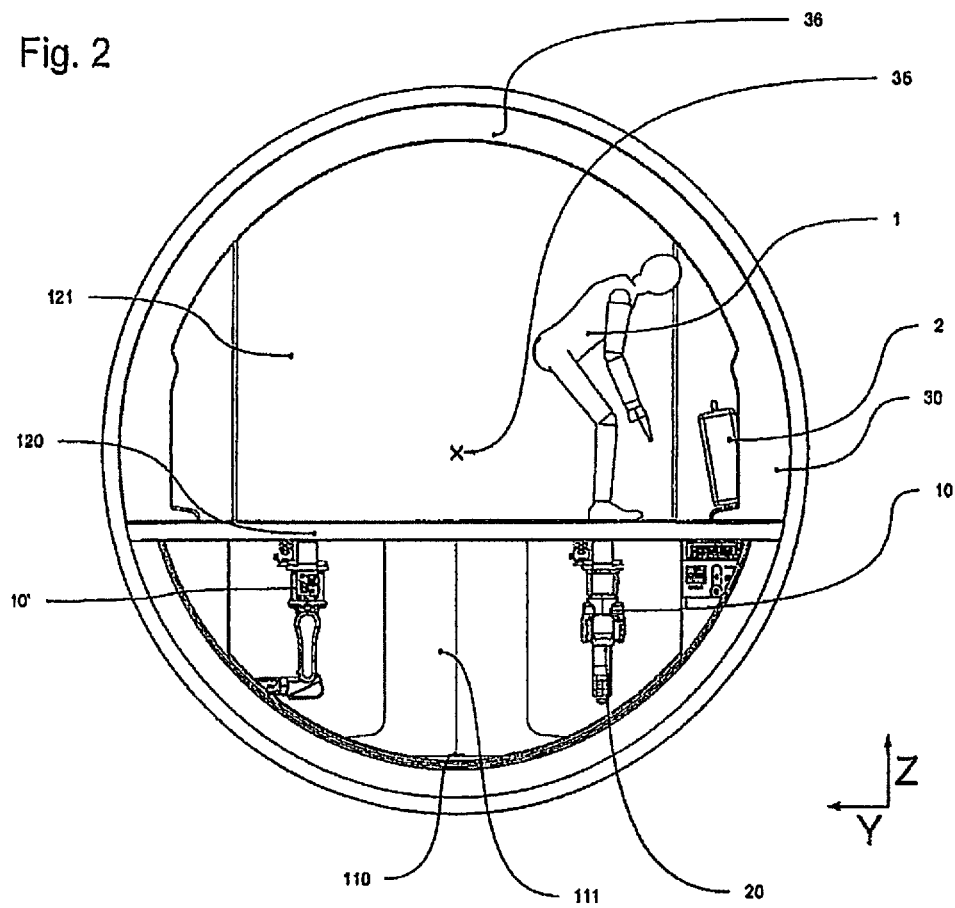
Figure 3:
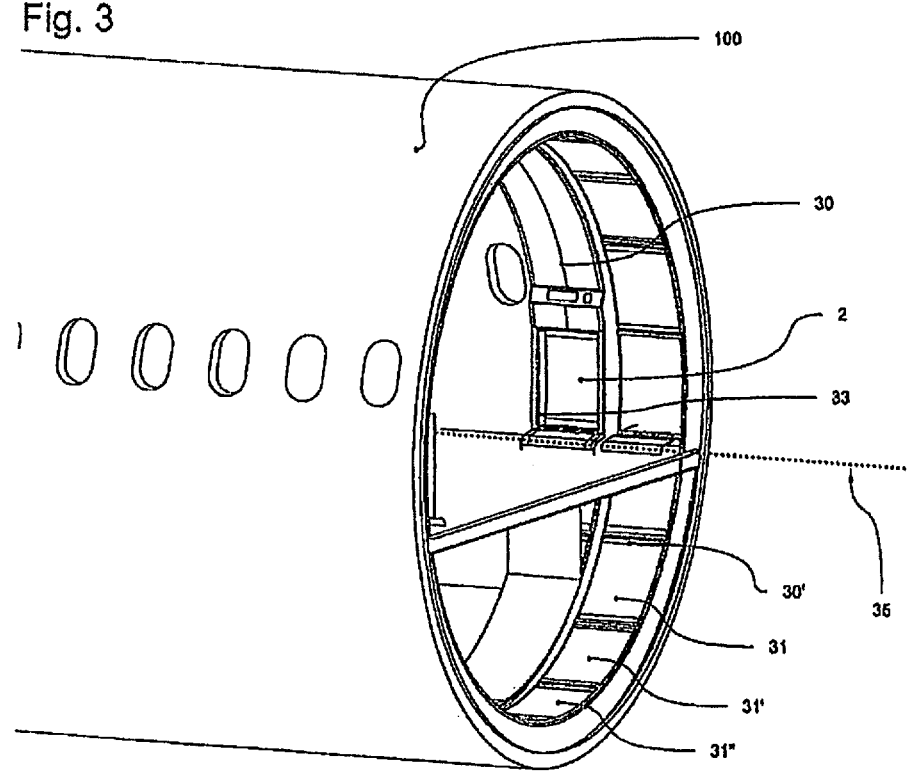
Figure 4:
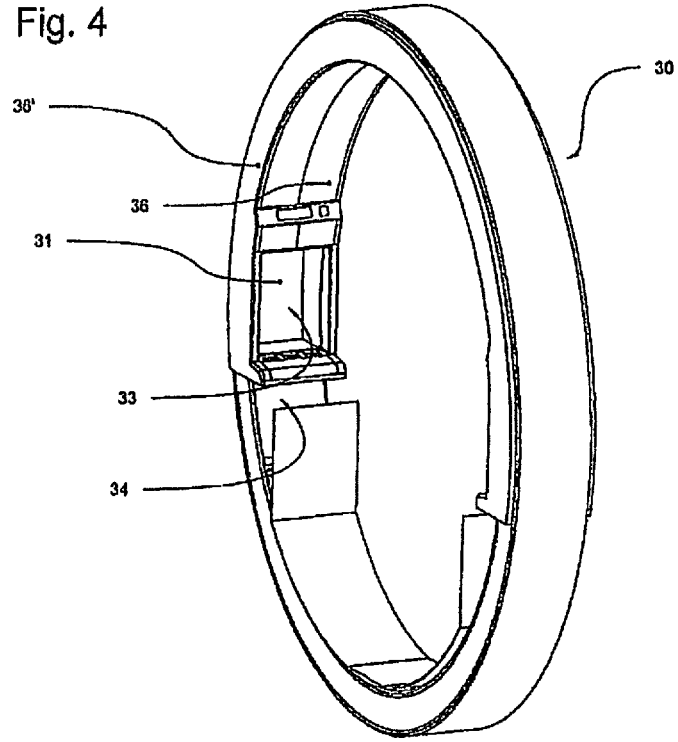
Figure 5:
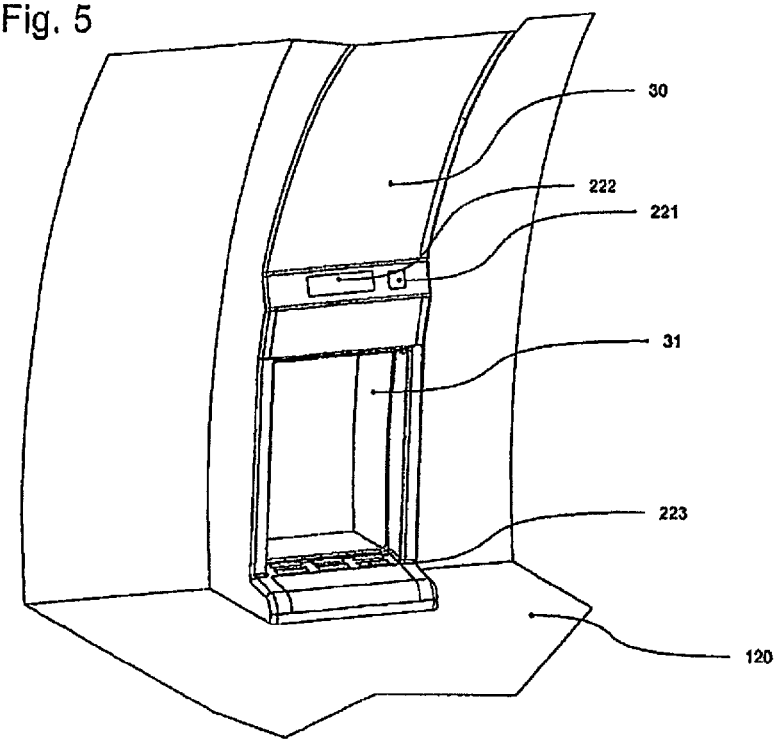
Figure 6:
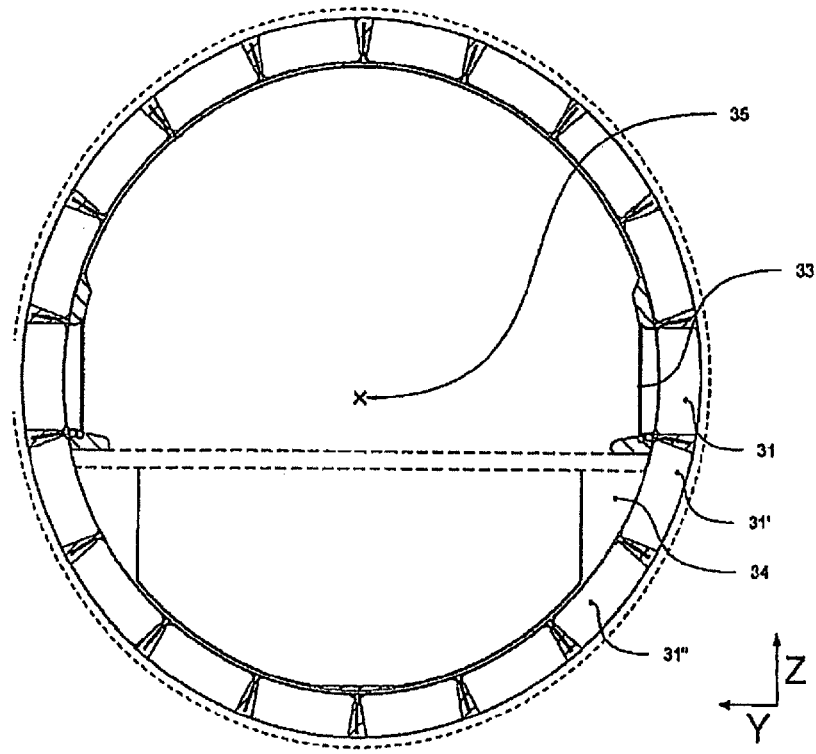
Figure 7:
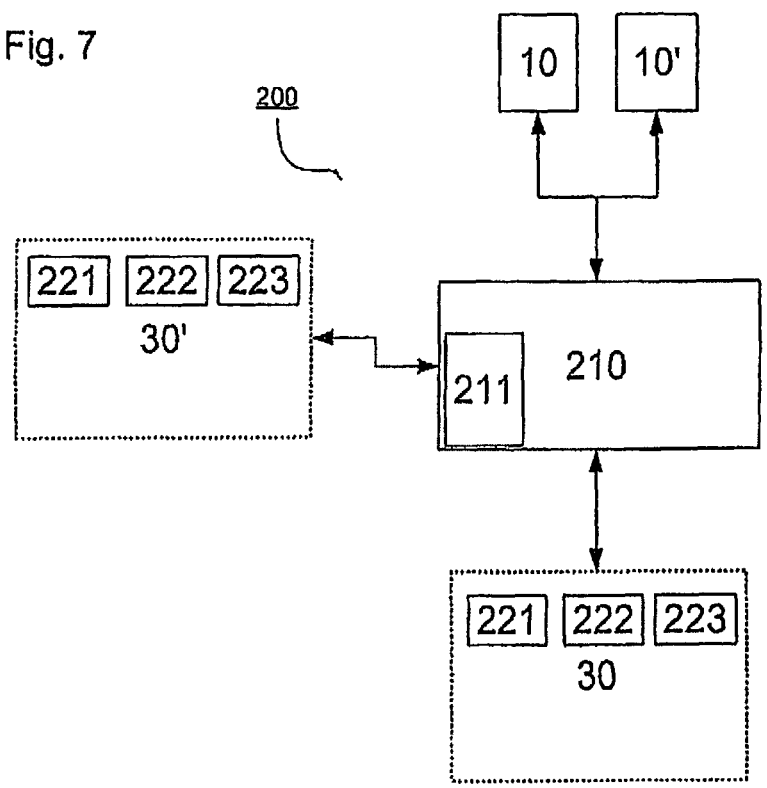
Figure 8:
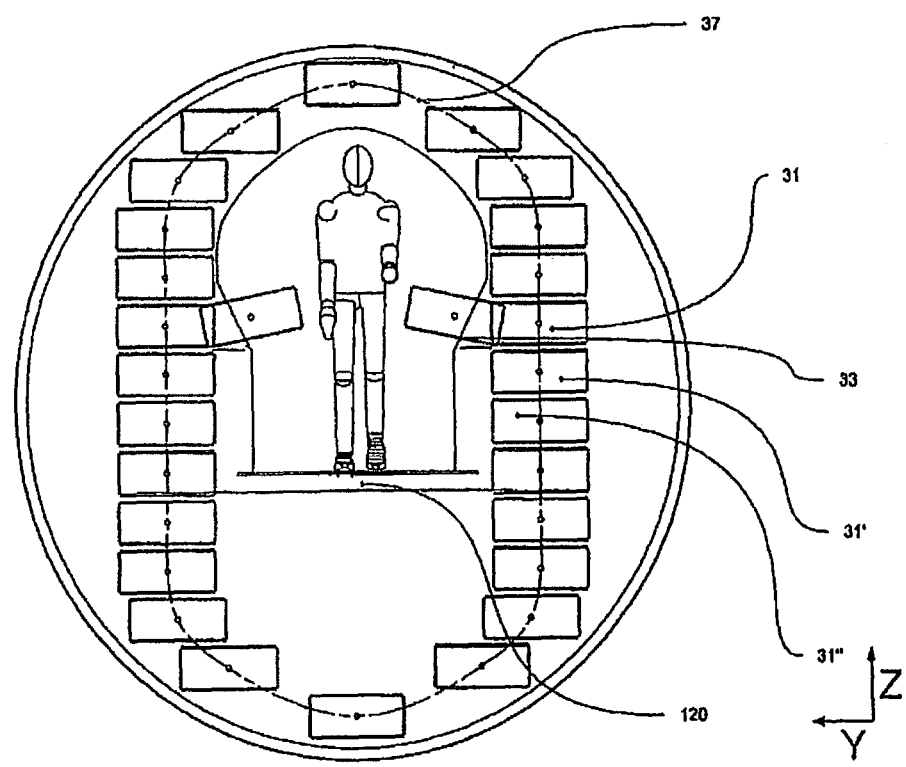
Figure 9:
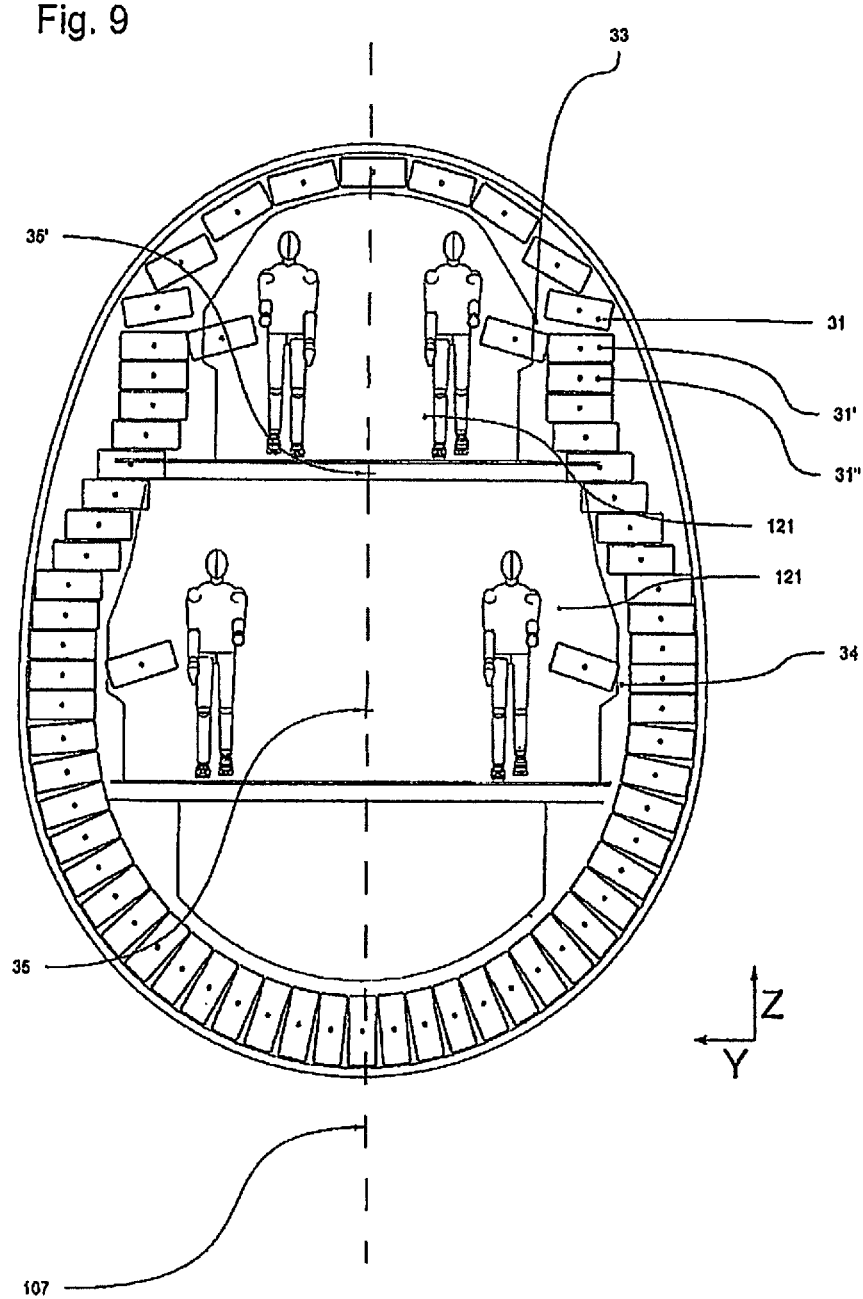
Figure 10:
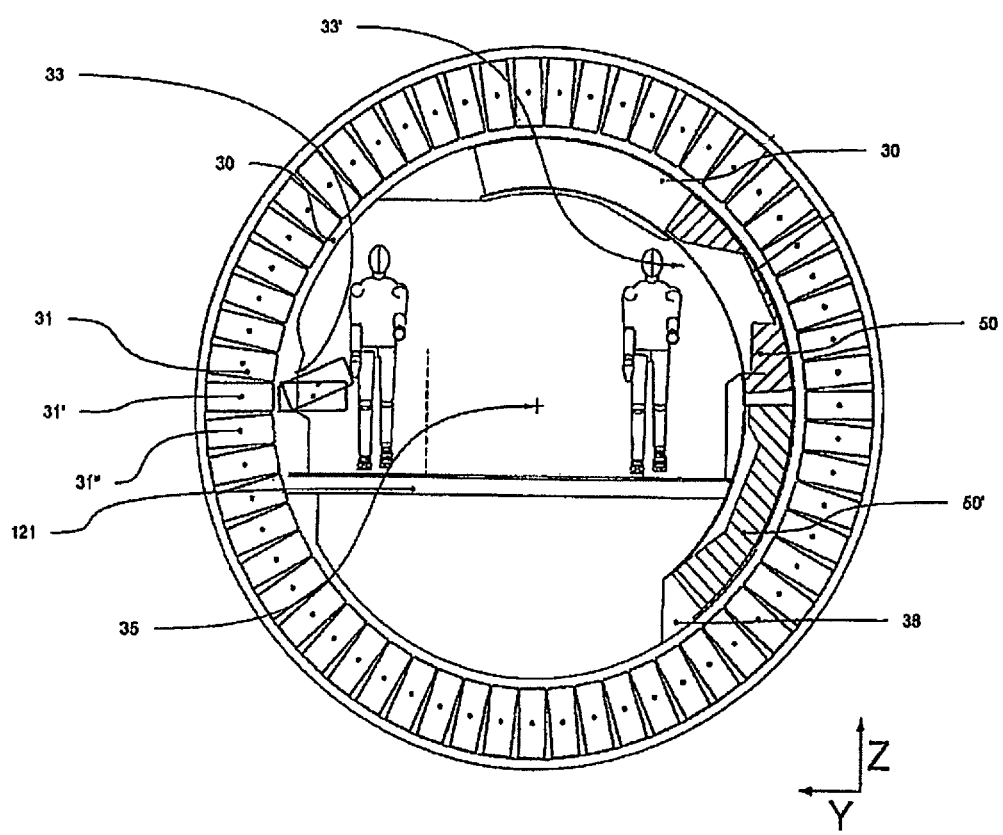

The invention is described in more detail below with reference to several embodiment examples shown against the drawings. These show:

FIG. 1 a diagrammatic external view of an aircraft;

FIG. 2 a cross section through the fuselage of the aircraft in FIG. 1 with a lift for transport of freight items from the passenger cabin to the cargo hold;

FIG. 3 a perspective view of a part segment of the fuselage of the aircraft in FIG. 1;

FIG. 4 a detailed view of the lift in FIG. 2;

FIG. 5 the upper lift opening of the lift in FIG. 4;

FIG. 6 a section through the lift in FIG. 4;

FIG. 7 individual components of a freight administration device for controlling the lift;

FIG. 8 a cross section through the fuselage of an aircraft with a lift for transport of freight items in an elliptical guide ring;

FIG. 9 a cross section through the fuselage of a wide-bodied aircraft with a lift for transport of freight items, and FIG. 10 a cross section through the fuselage of an aircraft with two lifts, one for transport of freight items and a second for pivoting kitchen elements.

DESCRIPTION

The same reference numerals are used below for the same parts and those with the same effect.

FIG. 1 shows a side view of an aircraft 100. The aircraft 100 extends substantially along a longitudinal axis, namely the aircraft longitudinal direction X, wherein the nose 103 is at the front and the tail 102 is at the rear. The Z axis of the aircraft 100 extends upwards transverse to the aircraft longitudinal direction X. On the side of the aircraft 100 is a loading hatch 101 via which freight items can be loaded into the aircraft 100 and unloaded therefrom again.

FIG. 2 shows a cross section through the aircraft 100 in FIG. 1. The fuselage of the aircraft 100 is substantially circular about a rotation axis 35. The rotation axis extends substantially parallel to the aircraft longitudinal direction X. The interior of the aircraft is divided by the passenger deck 120, which extends along the aircraft longitudinal direction X, into a passenger cabin 121 (top) and a cargo hold 111 (below). The fuselage 105 comprises several lifts 30, 30' as shown in FIG. 3. FIG. 2 shows the side view of the first lift 30 which is arranged annular along the outer skin of the aircraft 100 and serves to transport freight items, for example in the form of a suitcase 2, to and fro between the passenger cabin 121 and the cargo hold 111. The cargo hold is limited at the bottom by the freight deck 110. In the cargo hold 111 are two robots 10, 10' fitted with corresponding robot arms 20 in order to stow the freight items transported by the lift 30 in the cargo hold 111. Also on request freight items can be retrieved by robots 10, 10' from the cargo hold 111, loaded into the lift 30 and transported into the passenger cabin 121.

It is conceivable to equip the aircraft 100 merely with one lift 30. However several lifts according to the invention can be provided in an aircraft 100 to guarantee faster transport of the suitcases 2 of the passengers 1. An aircraft 100 fitted with two lifts 30, 30' is shown in FIG. 3. The lifts 30, 30' are here arranged directly adjacent and running parallel to each other. It is evident that the lifts 30, 30' have a multiplicity of lift cabins 31, 31', 31" which are each swivellable, rotationally mobile, about the rotation axis 35. Finally the individual lift cabins 31, 31', 31" form a chain which can be moved along an orbit.

FIG. 4 shows an aircraft segment in which the lift 30 is integrated. On the outside of the segment is the aircraft outer skin which is stiffened by frames arranged as rings inside the aircraft 100. These frames form a first guide ring 36 and a second guide ring 36', between which are arranged the chains of lift cabins 31, 31', 31". The guide rings 36, 36' contain a sliding block guide in which the individual lift cabins 31, 31', 31" engage, wherein the sliding block guide is formed such that the lift cabins 31, 31', 31" can be guided along the orbit predefined by the guide rings 36, 36'.

The lift 30 has an upper lift opening 33 which extends into the interior of the passenger cabin 121. This upper lift opening 33 allows the passengers 1 to load individual lift cabins 31, 31', 31" with suitcases 2. Furthermore a lower lift opening 34 is provided which opens into the cargo hold 111. The suitcases 2 can be transported away and stowed by personnel located in the cargo hold 111. In the embodiment example described this activity is performed by the robots 10, 10'.

FIG. 5 shows a detailed view of an upper lift opening 33 of the lift 30. As already explained, this opens into the passenger cabin 121 so that a lift cabin 31 in a receiving position can easily be loaded. The lift 30 furthermore has an RFID read device 123 which, on insertion of a suitcase 2 in the lift cabin 31, detects an RFID tag on the suitcase so that the lift 30 knows which suitcase 2 is in which lift cabin 31, 31', 31". Furthermore an input device 221 and an output device 222 are provided to guarantee communication with the passenger 1.

FIG. 6 shows a cross section through the first lift 30, wherein the multiplicity of lift cabins 31, 31', 31" can be seen. As already explained, these form a chain which can move rotationally mobile about the rotation axis 35. For movement of these chains, corresponding actuators or drive units are provided in the lift 30. With reference to FIG. 6, it is furthermore shown that the lift 30 has two upper lift openings 33 and two lower lift openings 34 which are each arranged mirror-symmetrically on the left side and right side of the aircraft 100. To this extent it is possible to obtain access to the contents of the individual lift cabins via each of the two upper lift openings 33 and lower lift openings 34.

The loading and unloading processes described of the lifts 30, 30' can be implemented by a central or decentral computer system. Thus the aircraft 100 can comprise a freight administration device 200 with a control device 210 (see FIG. 7) which stands in communicative connection with the robots 10, 10' and the lifts 30, 30'. The control unit 210 controls the robots 10, 10' as well as the first lift 30 and the second lift 30'. Amongst others drive units can be activated by the control unit 210 to move the robots 10, 10' along the longitudinal direction of the aircraft 100, and servo motors to move the robot arms 20. Servo motors for tools provided on the robot arms 20 can also be operated by the control unit 210. Also the control unit 210 communicates with the lifts 30, 30'. In one embodiment example these each comprise an input device 221, an output device 222 and an RFID device 223. To this extent it is possible, after a suitcase 2 has been deposited in a lift cabin 31, 31', 31", to structure the further loading process fully automatically. Furthermore the passenger 1 can communicate with the control unit 210 via the input device 221 and the output device 222 and tell it that he needs his suitcase 2. Thereupon the control unit 210 controls the robots 10, 10' such that the suitcase 2 can be loaded from the cargo hold into a lift cabin 31, 31', 31" and transported by one of the lifts 30, 30' into the passenger cabin 121.

The lift 30, 30' described can also be used without robots 10, 10' since, because of the multiplicity of lift cabins 31, 31', 31", there are a multiplicity of stowage options.

Furthermore it should be evident that not only suitcases 2 but also devices, drinks, food etc. can be stored in the individual lift cabins 31, 31', 31".

In the embodiment example described, the lift 30 comprises a chain of lift cabins 31, 31', 31" which each provide a cuboid receiver compartment. Theoretically it is also possible to provide a guide belt which runs peripherally along the outer skin of the aircraft and has protrusions which delimit the individual receiver compartments. To this extent the conveyor belt could be used to transport the freight items within an annular cavity or shaft.

In the embodiment example described, the lifts 30, 30' can each be accessed from the interior, e.g. from the passenger cabin 121 and from the cargo hold 111. Theoretically it would also be possible to provide a door and/or a hatch on the aircraft 100 by means of which it is possible to load the lifts 30, 30', in particular the lift cabins 31, 31', 31" from the outside. For example corresponding upper lift openings 33 and lower lift openings 34 can be provided for this which are mounted on the outer skin of the aircraft 100.

As already explained it is possible to use guide rings 36, 36' which do not have a circular design. For example the lift 30 according to FIG. 8 is equipped with elliptical guide rings 36, 36' or guide rings 36, 36' in the form of a rectangle with rounded corners.

In FIG. 9 the guide rings 36, 36' are formed such that they substantially depict the merging of two circles of different radii. The individual lift cabins 31, 31', 31" in a lower segment of the aircraft 100 rotate about a first rotation axis 35 and in an upper segment about a second rotation axis 35'. Both rotation axes lie on a centre plane 107 of the aircraft 100 which extends along the longitudinal direction (X direction) and the height direction (Z direction). Preferably the centre plane 107 divides the aircraft 100 into two substantially symmetrical halves. Theoretically it would also be possible to provide further rotation axes 35, 35' which define the movement track of the lift cabins 31, 31', 31" and hence also the design of the guide rings 36, 36'.

Numerous other embodiments of the guide rings 36, 36' are conceivable including dumb-bell shape or snowman shape. In FIG. 9 the guide rings 36, 36' for example are adapted to the cross section shape of a wide-bodied aircraft.

Furthermore the embodiments according to FIG. 8 differ from those in FIG. 6 in that the individual lift cabins 31, 31', 31" are arranged articulated on a drive belt 37 such that these are oriented in the same way in every position within the guide rings 36, 36'. This means that the cuboid lift cabins 31, 31', 31" in each position extend parallel to the passenger deck 120. To this extent it would be conceivable to stow devices and/or other objects sensitive to their orientation in the individual lift cabins 31, 31', 31".

Furthermore it is possible to use the lift 30, 30' according to the invention to connect several passenger cabins 121. A corresponding embodiment example is shown in FIG. 9. Here a first and a second passenger cabin 121 have upper and lower lift openings 33, 34 arranged in pairs. Further lift openings 33, 34 can be provided in the cargo hold 11.

Furthermore FIG. 9 shows that numerous different methods are conceivable for guiding the individual lift cabins 31, 31', 31". Thus according to this embodiment example, the lift cabins 31, 31', 31" are stacked above each other in the lower region of the aircraft and rotate about their axes, while in the upper region a sequential queue arrangement is formed.

FIG. 10 shows an embodiment example in which a second lift 30' is arranged inside a first lift 30. The first lift 30 is similar to that in FIG. 6 wherein however the cuboid lift cabins 31, 31', 31" are oriented radial to the rotation axis 33 and not tangential (FIG. 6). There is a first upper lift opening 33 which allows loading of the first lift 30. Inside the guide rings 36, 36' are arranged pairs of guide segments 38 which extend over an angle of around 180° in relation to the rotation axis 35. The guide segments 38 accommodate, preferably in a sliding block guide, a single compartment which contains a first kitchen element 50 and a second kitchen element 50'. The kitchen elements 50, 50' are adapted to the orbit predefined by the rotation axis 35 and sit more or less on top of each other. The kitchen elements 50, 50' can swivel about the rotation axis 35 such that via a second upper lift opening 33' either the first or the second kitchen element 50, 50' is accessible. To this extent the aircraft personnel can access either the first or the second kitchen element 50, 50'.

Naturally it is possible to use the second lift 30' described without the first lift 30. Furthermore it is conceivable to arrange and structure the second lift 30' such that the kitchen elements 50, 50' can be fully recessed. Segments of the upper kitchen element 50 can then form a part of the passenger deck 121 which can preferably be walked on.

The individual embodiment examples of the lift 30, 30' according to the invention can be combined in any arbitrary fashion.

LIST OF REFERENCE NUMERALS

1 Passenger
2 Suitcase
10, 10' Robot
20 Robot arm
30, 30' Lift
31, 31', 31" Lift cabin
33 Upper lift opening
34 Lower lift opening
35, 35' Rotation axis
36, 36' Guide ring
37 Drive belt
38 Guide ring segment
50, 50' Kitchen element
100 Aircraft
101 Loading hatch
102 Tail
103 Nose
105 Fuselage
107 Centre plane
110 Freight deck
111 Cargo hold
120 Passenger deck
121 Passenger cabin
200 Freight administration device
210 Control unit
211 Storage device
220 Freight item receiver device
221 Input device
222 Output device
223 RFID read device

The invention claimed is:

1. A lift for an aircraft comprising:
a plurality of lift cabins, each lift cabin configured to receive a freight item wherein neighboring lift cabins are connected to each other to form a chain of lift cabins;
at least one opening for loading and/or unloading the lift; and
a first guide ring and a second guide ring, between which the lift cabins are arranged mobile in a slotted guide of the first and second guide rings such that the lift cabins are displaceable along the guide rings in a rotation movement about a rotation axis.

2. The lift according to claim 1, including at least one conveyor ring which is arranged rotationally mobile between the guide rings and comprises at least one subdivision segment to form at least one of the lift cabins, wherein the subdivision segment is arranged on the inner face of the conveyor ring.

3. The lift according to claim 1, including a multiplicity of subdivision segments which are arranged such that the subdivision segments in each case in pairs delimit a lift cabin.

4. The lift according to claim 1, wherein at least one lift cabin comprises a deposit device with a deposit surface which is arranged rotationally mobile in the lift cabin such that the deposit surface is oriented parallel to a passenger deck and/or freight deck of the aircraft irrespective of the position of the lift cabin, and/or that the at least one lift cabin is arranged rotationally mobile such that the deposit surface is oriented parallel to the passenger deck and/or freight deck of the aircraft irrespective of the position of the lift cabin.

5. The lift according to claim 1, wherein the lift is formed such that the at least one lift cabin can be brought into at least one receiving position opposite an opening for loading and/or unloading, and the lift cabin can be swiveled in relation to the receiving position about the rotation axis by at least 30°.

6. The lift according to claim 1, including a freight administration device with at least one input device to detect a code allocated to the freight item, wherein the freight administration device is adapted such that after input of a code, it identifies the freight item and/or the lift cabin allocated to the code and controls at least the lift such that the corresponding lift cabin is brought into a receiving position for unloading the lift cabin.

7. The lift according to claim 6, wherein the input device comprises a read device for an identification device, the read device comprising a passive transponder and/or a 2D code and/or 3D code arranged on or in the freight item.

8. The lift according to claim 6 wherein the freight administration device is adapted to store, for a freight item placed in the lift, a correlation between the code allocated to the freight item and the lift cabin of the freight item and/or a correlation between a code allocated to a passenger and the lift cabin.

9. An aircraft segment, the aircraft segment being generally barrel-shaped and including a lift according to claim 1.

10. The aircraft segment according to claim 9, wherein the rotation axis lies in the center plane of the aircraft or runs parallel to the longitudinal direction of the aircraft close to the center plane (X-Z plane).

11. The aircraft segment according to claim 9 including at least one robot with at least one robot arm to remove freight items from the at least one lift cabin, wherein the robot is arranged in the cargo hold.

12. The aircraft segment according to claim 11, including
 a holder device attached to a ceiling construction and/or wall construction with at least one linear guide, and
 a drive unit for moving the robot with respect to the at least one linear guide along a longitudinal axis of the aircraft.

13. A method for stowing freight items from a passenger cabin of an aircraft, in particular by means of a lift according to claim 1 comprising the steps:
 receiving the freight item in a first lift cabin of the lift in the passenger cabin,
 swiveling of the lift cabin about a rotation axis so that a further lift cabin is ready to receive further freight items in the passenger cabin,
 removal of the freight item in a cargo hold for further stowage.

* * * * *